United States Patent
Sudmeier et al.

(10) Patent No.: US 12,026,005 B2
(45) Date of Patent: Jul. 2, 2024

(54) CONTROL MECHANISM OF EXTRACT TRANSFER AND LOAD (ETL) PROCESSES TO IMPROVE MEMORY USAGE

(71) Applicant: SAP SE, Walldorf (DE)

(72) Inventors: Reinhard Sudmeier, Heidelberg (DE); Sreenivasulu Gelle, San Ramon, CA (US); Alexander Ocher, San Jose, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/968,057

(22) Filed: Oct. 18, 2022

(65) Prior Publication Data

US 2024/0126774 A1    Apr. 18, 2024

(51) Int. Cl.
*G06F 16/00* (2019.01)
*G06F 16/23* (2019.01)
*G06F 16/25* (2019.01)

(52) U.S. Cl.
CPC ........ *G06F 16/254* (2019.01); *G06F 16/2358* (2019.01); *G06F 16/2386* (2019.01); *G06F 16/258* (2019.01)

(58) Field of Classification Search
CPC ...... G06F 16/254; G06F 16/9577; G06F 8/38; G06F 9/4881; G06F 9/526; G06F 9/546; G06F 9/3004; G06F 9/30072; G06F 9/30079; G06F 9/3009; G06F 9/3834; G06F 16/2336; G06F 9/528; G06F 16/245; G06F 16/27; G06F 9/5072; G06F 11/2094; G06F 16/2477; G06F 16/2228; G06F 16/00; G06F 16/22; G06F 16/23; G06F 16/235; G06F 16/2372; G06F 16/2423; G06F 16/26; G06F 16/33; G06F 16/3334; G06F 3/04842; G06F 40/177; G06F 16/2462; G06F 16/248; G06F 16/25; G06F 16/9038; G06F 16/9538;
(Continued)

(56) References Cited

U.S. PATENT DOCUMENTS 7,512,614 B2    3/2009    Yao
9,740,525 B2    8/2017    Scheuer
(Continued)

FOREIGN PATENT DOCUMENTS

CN        104391929 A       3/2015

*Primary Examiner* — Shyue Jiunn Hwa
(74) *Attorney, Agent, or Firm* — Sterne, Kessler, Goldstein & Fox P.L.L.C.

(57) ABSTRACT

Embodiments are described for a data processing tool configured to cease operations of a plurality of database readers when detecting a congestion condition in the data processing tool. In some embodiments, the data processing tool comprises a memory, one or more processors, and a plurality of database readers. The one or more processors, coupled to the memory and the plurality of database readers are configured to determine a congestion condition in at least one data pipeline of a plurality of data pipelines of the data processing tool. Each data pipeline of the plurality of data pipelines connects a database reader and a transformer of the data processing tool, a transformer and a database writer of the data processing tool, or two transformers of the data processing tool. The one or more processors are further configured to refrain from reading data from one or more databases responsive to the congestion condition.

20 Claims, 6 Drawing Sheets

(58) Field of Classification Search
CPC ........ G06F 16/951; G06F 40/18; G06F 16/28; H04L 1/00
See application file for complete search history.

(56) References Cited

U.S. PATENT DOCUMENTS

| | | |
|---|---|---|
| 10,275,504 B2 | 4/2019 | Bender |
| 11,275,617 B2 | 3/2022 | Das et al. |
| 2008/0114937 A1* | 5/2008 | Reid ................... G06F 11/3636 710/22 |
| 2011/0213756 A1 | 9/2011 | Chen et al. |
| 2016/0269247 A1* | 9/2016 | Chakradhar ............ H04L 45/02 |

* cited by examiner

CONTROL MECHANISM OF EXTRACT TRANSFER AND LOAD (ETL) PROCESSES TO IMPROVE MEMORY USAGE

BACKGROUND

A data processing tool, such as an extract, transfer, and load (ETL) system, can take input data from one or more data sources, process the input data, and deliver the processed input data to one or more data sinks. In some embodiments, the input data to be processed can be held in buffers of the data processing tool. The data processing tool can experience data overflow or buffer overflow when an amount of the input data waiting to be processed is greater than a capacity of the buffers of the data processing tool. In such a case, the input data may be lost and a dynamic control mechanism is needed to improve the efficiency and the reliability of the data processing tool.

SUMMARY

Some embodiments of this disclosure relate to apparatus, system, computer program product, and method embodiments for implementing a dynamic control mechanism of a data processing tool.

Some embodiments of this disclosure provide data processing tool comprising a plurality of database readers, a plurality of transformers, and one or more database writers. The plurality of database readers are configured to determine a congestion condition in at least one data pipeline of a plurality of data pipelines. Each data pipeline of the plurality of data pipelines connects a database reader of the plurality of database readers and a transformer of the plurality of transformers, a transformer of the plurality of transformers and a database writer of the one or more database writers, or two transformers of the plurality of transformers. The plurality of database readers are further configured to refrain from reading data from one or more databases responsive to the congestion condition.

Some embodiments of this disclosure provide a method of a data processing tool. The data processing tool comprises a plurality of database readers, a plurality of transformers, and one or more database writers. The method comprises determining, by the plurality of database readers, a congestion condition in at least one data pipeline of a plurality of data pipelines. Each data pipeline of the plurality of data pipelines connects a database reader of the plurality of database readers and a transformer of the plurality of transformers, a transformer of the plurality of transformers and a database writer of the one or more database writers, or two transformers of the plurality of transformers. The method further comprises refraining from, by the plurality of database readers, reading data from one or more databases responsive to the congestion condition.

Some embodiments of this disclosure provide a non-transitory computer-readable medium (CRM) comprising instructions to, upon execution of the instructions by one or more processors of a data processing tool, cause the data processing tool to perform operations. The operations comprise determining a congestion condition in at least one data pipeline of a plurality of data pipelines. Each data pipeline of the plurality of data pipelines connects a database reader of the plurality of database readers and a transformer of the plurality of transformers, a transformer of the plurality of transformers and a database writer of the one or more database writers, or two transformers of the plurality of transformers. The operations further comprise refraining from reading data from one or more databases responsive to the congestion condition.

This Summary is provided merely for the purposes of illustrating some embodiments to provide an understanding of the subject matter described herein. Accordingly, the above-described features are merely examples and should not be construed to narrow the scope or spirit of the subject matter in this disclosure. Other features, embodiments, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing a dynamic control mechanism of a data processing tool.

In some embodiments, data processing tool, such as an ETL system, can read data from various data sources. For example, the data processing tool can read from one or more databases or files to retrieve data. The data processing tool can then transform the data retrieved. For example, the data processing tool can combine, split, and/or process data retrieved. Finally, the data processing tool can write the transformed data to one or more data sinks. The data sinks can be databases, files, or other data storage devices.

In some embodiments, the data processing tool can read data faster than transforming or writing data. For example, the data processing tool can read 10 million records in a period of time, but can transform 2 million records in the same period of time. The 8 million records that were read by the data processing tool but not yet transformed are stored in one or more buffers of the data processing tool. In some embodiments, at least one buffer may reach its capacity and can no longer take any more data. In such a case, a congestion condition occurs in the data processing tool and any additional data that are read may be lost. In some embodiments, the data processing tool may stop reading from the data sources. For example, the data processing tool may have a first database reader and a second database reader that reads data from the data sources. Both the first and the second database readers connect to a transformer via a first data pipeline and a second data pipeline, respectively. A first buffer may correspond to the first data pipeline and may reach its capacity. Therefore, the congestion occurs in the first data pipeline but not in the second data pipeline. In such a case, the data processing tool can stop the first database reader from reading more data from the data sources and wait for the transformer to process data stored in the first buffer. However, the second database reader may still be operating at its full speed and thus causing congestion in the second data pipeline while the first data pipeline is still in the congestion or shortly after the first data pipeline clears the congestion. Therefore, the data processing tool is forced to stop at least one database reader at any given time or turn off the first database reader shortly after turning it on. In some aspects, the transformer is also referred to as a transform.

In some embodiments, it is beneficial to avoid turning on and turning off database readers frequently. Instead, the data processing tool can turn off all database readers, such as the first and the second database readers, when detecting a congestion condition in any data pipeline. In such a case, frequently turning on and off database readers can be avoided because buffers of the data processing tool are being cleared at the same time, not one after another.

In some embodiments, the data processing tool can use a global mutex parameter to control the database readers. For example, the database readers can query the global mutex parameter, which can indicate whether to stop reading. When a data pipeline detects a congestion condition, it can update the global mutex to reflect a congestion condition. On the other hand, if the data pipeline determines that the congestion is no longer present, the data pipeline can also update the global mutex to indicate a no-congestion condition and the database readers can resume reading data.

Figure 1:
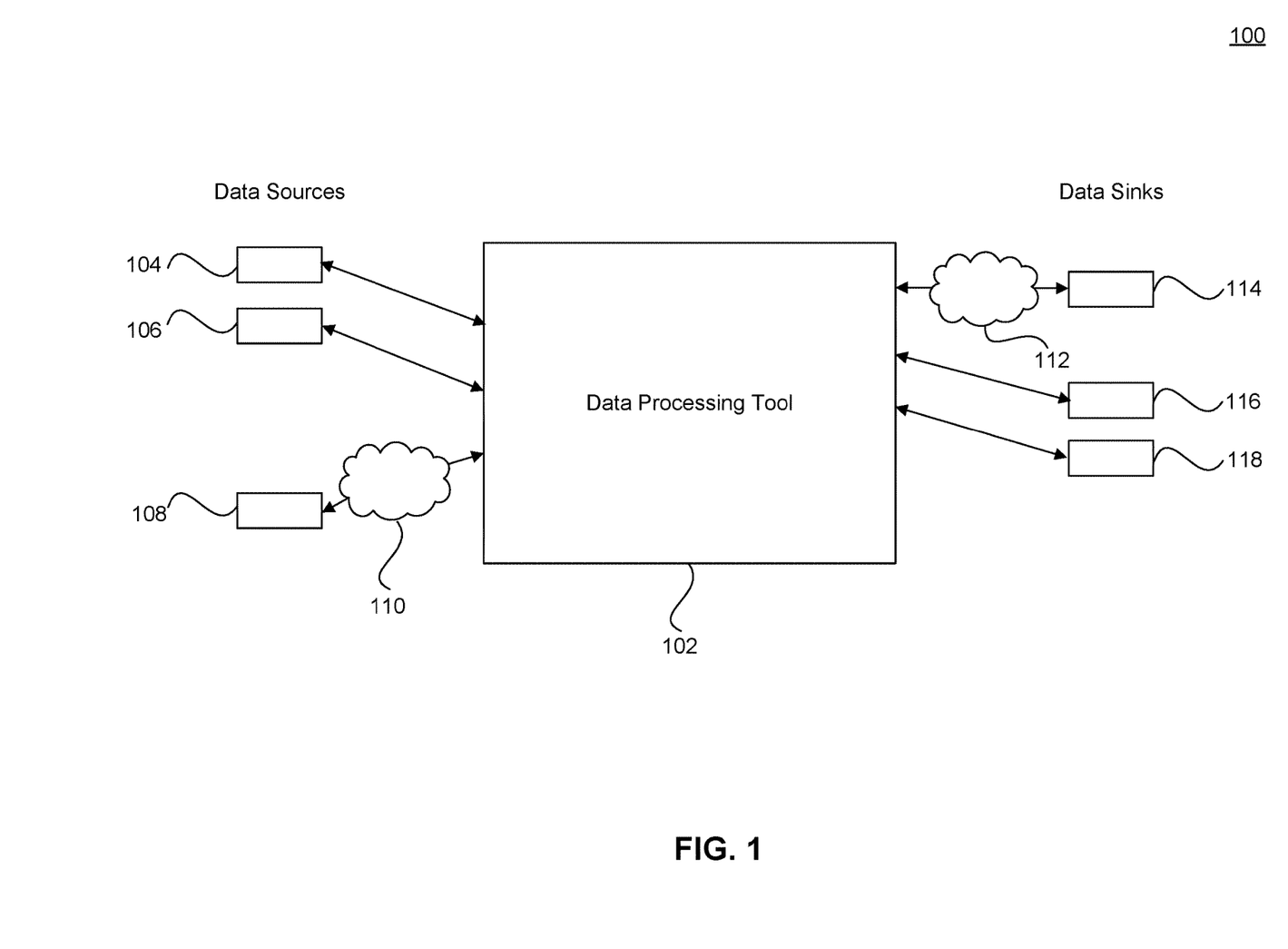
FIG. 1 illustrates an example system implementing a dynamic control mechanism of a data processing tool, according to some embodiments of the disclosure.

FIG. 1 illustrates an example system 100 implementing a dynamic control mechanism of a data processing tool, according to some embodiments of the disclosure. The example system 100 is provided for the purpose of illustration only and does not limit the disclosed embodiments. The example system 100 may include, but is not limited to, a data processing tool 102, data sources 104, 106, and 108, and data sinks 114, 116, and 118. The data processing tool 102 may include, but is not limited to, laptops, desktops, personal computers, cloud servers, wireless communication devices, smartphones, tablets, personal assistants, monitors, televisions, wearable devices, Internet of Things (IoT) devices, vehicle communication devices, and the like. The data sources 104, 106, and 108 and the data sinks 114, 116, and 118 may include, but are not limited to, databases, data files, data storage system, and the like.

In some embodiments, the data processing tool 102 connects with one or more data sources, such as the data sources 104, 106, and 108. The data processing tool 102 may connect to the data sources 104 and 106 via direct connections including wired connections, wireless connections, internal connections, bus connections, virtual connections or other types of connections. The data, processing tool 102 may also connect to the data source 108 via an indirect connection 110 via networks, such as the Internet, cloud servers, private networks, and the like. The data processing tool 102 may also connect to the data sinks 114, 116, and 118. Similarly, the data processing tool 102 may connect with the data sinks 116 and 118 via direct connections and may connect with the data sink 114 via an indirect connection 112. In some embodiments, the data processing tool 102 can also connect with additional data sources and data sinks that are not shown in FIG. 1.

In some embodiments, the data processing tool 102 retrieves data from the data sources 104, 106, and 108 via the direct and indirect connections. The data processing tool 102 can also process the retrieved data. For example, the data processing tool 102 can convert the retrieved data into a different format. The data processing tool 102 may also combine data from multiple data sources. For example, the data processing tool 102 can retrieve data from the data sources 104 and 106, combine them, and send the combined data to the data sink 114. The data processing tool 102 can also split data from a data source. For example, the data processing tool 102 can retrieve data from the data source 108, split the data, and send the split data to the data sinks 116 and 118.

Figure 2:
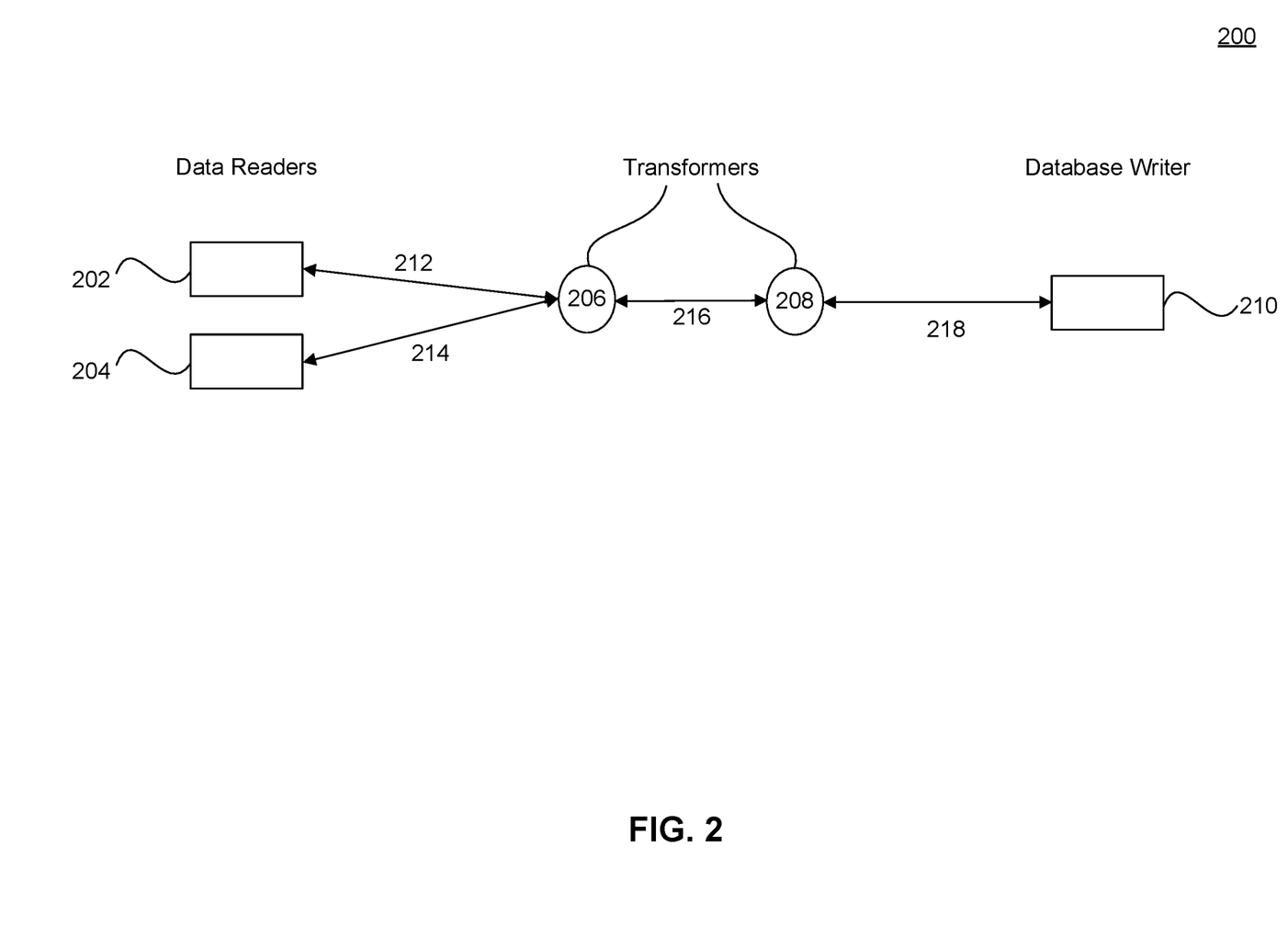
FIG. 2 illustrates a block diagram of an example system of the data processing tool, according to some embodiments of the disclosure.

FIG. 2 illustrates a block diagram of an example system 200 of a data processing tool, according to some embodiments of the disclosure. As a convenience and not a limitation, FIG. 2 may be described with regard to elements of FIGS. 1 and 6. The example system 200 may represent the operation of devices (e.g., the data processing tool 102 of FIG. 1) implementing the dynamic control mechanism. The example system 200 may also be performed by computer system 600 of FIG. 6. But the example system 200 is not limited to the specific embodiments depicted in those figures and other systems may be used to perform the method, as will be understood by those skilled in the art. It is to be appreciated that not all operations may be needed, and the operations may not be performed in the same order as shown in FIG. 2.

In some embodiments, the example system 200 includes database readers 202 and 204 and a database writer 210. The database readers 202 and 204 can read data from one or more databases and/or other data sources, such as the data sources 104, 106, and 108 of FIG. 1, as discussed above. The database readers 202 and 204 can also be referred to as ETL source readers or source readers. The database writer 210 can write data to one or more data sinks, such as the data sinks 114, 116, and 118 of FIG. 1, as discussed above. The database readers 202 and 204 and the database writer 210 are connected via one or more transformers. For example, the database reader 202 connects with the database writer 210 via a transformer 206 and a transformer 208. In some embodiments, database readers connect with transformers via data pipelines. For example, the database reader 202 connects with a transformer 206 via a data pipeline 212. Similarly, the database reader 204 connects with the transformer 206 via a data pipeline 214. In some embodiments, the database reader 202 can write data to the data pipeline 212 and the transformer 206 can read the data from the pipeline. Similarly, the database reader 204 can write data to the data pipeline 214 and the transformer 206 can read from the data pipeline 214. Furthermore, the transformer 206 can combine data received from the data pipeline 212 and 214. For example, the transformer 206 can receive a million recorders from the data pipeline 212 and a million recorders from the data pipeline 214; combine the recorders into a batch of 2 million recorders; and write the 2 million records to a data pipeline 216. A transformer 208 can read the 2 million recorders from the data pipeline 216; process the 2 million recorders; and write them to a data pipeline 218. Finally, the database writer 210 can read from the data pipeline 218 and writes the combined and processed 2 million recorders to the one or more data sinks. In some aspects, the one or more transformers of FIG. 2 can also be referred to as one or more transforms. For example, the transformers 206 and 208 can also be referred to as transforms 206 and 208.

In some embodiments, elements of the example system 200, which includes the database readers 202 and 204, database writer 210, the transformers 206 and 208, and the data pipelines 212, 214, 216, and 218, each includes a memory and one or more processors. For example, the data pipeline 212 can include a memory. The data pipeline 212 can also include one or more processors to detect a congestion condition or a no-congestion condition as described further in detail below. In some embodiments, the elements of the example system 200 share a memory of the example system 200. For example, each element of the example system 200 is assigned a portion of the memory of the example system 200. In addition, each element can access the memory of the example system 200 and thus can access a portion of the memory assigned to itself and a portion of the memory assigned to other elements. Furthermore, the elements of the example system 200 can also share one or more processors of the example system 200. For example, when the transformer 206 needs to combine the data received from the data pipelines 212 and 214, one or more processors of the data processing tool can be assigned to the transformer 206 to perform combining the data.

In some embodiments, one or more pipelines of the example system 200 may have a congestion condition. For example, a speed of the transformer 206 processing the data from the data pipeline 212 may be smaller than that of the database reader 202 writing data into the data pipeline 212. In such a case, the data starts to accumulate in the data pipeline 212 and are stored in the memory of the data pipeline 212. The accumulated data are also referred to as buffering data in the data pipeline 212. However, because the memory of the data pipeline 212 is limited, the data stored in the data pipeline 212 can reach its storage capacity. In such a case, the data pipeline 212 is in the congestion condition and cannot take more data. The data pipeline 212 can detect the congestion condition by calculating an amount of data written into it and an amount of data read from it. For example, the data pipeline 212 can determine that 20 million recorders were written into the data pipeline 212 and the transformer 206 read 10 million records from the data pipeline 212 in a period of time. Thus, the data pipeline 212 can determine that an amount of data or a volume of data stored in the data pipeline 212 is 10 million records. If the capacity of the data pipeline 212 is 10 million recorders, the data pipeline 212 determines that it is in the congestion condition and cannot take more data. In some embodiments, the capacity of the data pipeline 212 can be a size of data. For example, the capacity can be 1 gigabyte (GB) data and the data pipeline 212 reaches the capacity when 1 GB data is stored in its memory.

In some embodiments, after detecting the congestion condition in the data pipeline 212, the data pipeline 212 or the example system 200 stops the database reader 202 from reading more data from the one or more data sources, such as the data sources 104, 106, and 108. However, the database reader 204 may still operate at its full speed and read more data to be written to the data pipeline 214. Similar to the database reader 202, the database reader 204 may be fast than the transformer 206. Therefore, while the transformer 206 clears data from the data pipeline 212 by reading from it, the data pipeline 214 starts to be filled up by the database reader 204. In some embodiments, the amount or volume of data stored in the data pipeline 212 reduces to below the storage capacity as the transformer 206 reads from it. The data pipeline 212 can detect such no-congestion condition and the database reader 202 can resume reading from the one or more data sources and writing to the data pipeline 212. However, the data pipeline 214 can become congested before or shortly after the data pipeline 212 detects the no-congestion condition. This is because while the data pipeline 212 is becoming less congested, the data pipeline 214 is becoming more congested. In such a case, the database readers 202 and 204 take turns to stop reading data, which is not efficient for the example system 200. For example, the example system 200 needs to configure the database readers 202 and 204 to stop and resume reading data frequently. In addition, the example system 200 may need to coordinate with the one or more data sources to stop and resume data reading.

In some embodiments, the example system 200 stops data reading for all database readers when a congestion condition is detected. For example, when the data pipeline 212 detects the congestion condition, the example system 200 stops both the database readers 202 and 204 from reading data from the one or more data sources. When the data pipeline 212 detects the no-congestion condition, the example system 200 resumes data reading for both the database readers 202 and 204. In such a case, the data pipeline 214 would not accumulate more data in its memory while the congestion of the data pipeline 212 is being cleared. Furthermore, less turning on and off the database readers 202 and 204 are expected.

In some embodiment, the example system 200 turns on and off the database readers 202 and 204 using a global parameter. For example, the global parameter can be a global mutex variable stored in the memory of the example system 200 and can be accessed by each element of the example system 200. When the data pipeline 212 detects the congestion condition, it updates the global mutex variable to indicate the congestion condition. The global muter variable can be scaler. For example, the global mutex variable can be initiated as 0. When the data pipeline 212 detects the congestion condition, it adds 1 to the global mutex variable. A database reader, such as the database readers 204 or 202, checks the global mutex variable periodically and/or prior to reading a data batch. If the database reader determines that the global mutex variable is greater than 0, the database reader may detect the congestion condition and stop reading from the one or more data sources. Otherwise, the database reader performs the data reading. On the other hand, when the data pipeline 212 clears the congestion, it can subtract 1 from the global mutex variable. In this case, the global mutex variable becomes 0 again and the database readers 202 and 204 can perform the data reading after checking the global mutex variable.

In some embodiments, an element, such as the data pipeline 212, may update the global mutex variable to indicate the no-congestion condition when the amount or volume of data stored in the data pipeline 212 reduces to a predetermined level below the storage capacity. For example, the storage capacity of the data pipeline can be 10 million records. The data pipeline 212 does not update the global mutex until the amount or volume of data stored in the memory of the data pipeline 212 drops below 90% or 80% of its the storage capacity, such as 9 million records or 8 million recorders. This prevents the database reader 202 from aiming on and off frequently. For example, the number of records stored in the data pipeline 212 can drop to 10 million −1. If the database reader 202 is turned on, the data pipeline 212 would reach its capacity in a very short time because only 1 record is required. On the other hand, if the database reader 202 is turned on when there are 8 million records in the data pipeline 212, the database reader 202 may not need to be turned off in a short period. In some embodiment, the predetermined level corresponds to a data reading speed of the database reader 202. For example, the database reader 202 may read data in batch and each batch includes 1 million recorders. In such a case, the predetermined level can be set to be at least 1 million recorders below the storage capacity so that the database reader 202 at least does not need to be turned off again after reading one batch.

In some embodiments, the congestion condition can be detected by elements other than data pipelines. For example, the database reader 202 can keep track of a number of records, such as N1 recorders, it writes to the data pipeline 212. The transformer 206 can also keep track of a number of recorders, such as N2 recorders, it reads from the data pipeline 212. Both the database reader 202 and the transformer 206 can store the N1 and the N2 in the memory of the example system 200 that can be accessed by any elements of the example system 200. Therefore, the database reader 202 can retrieve the N2 from the memory and determine whether there is a congestion condition in the data pipeline 212 based on a difference between the N1 and the N2. For example, the database reader 202 can determine that the N1 to be 13 million and the N2 to be 3 million. Therefore, the database reader 202 can determine that the data pipeline 212 currently holds 10 million recorders in its memory. Because the storage capacity of the data pipeline 212 is 10 million recorders, the database reader 202 determines that there is a congestion condition in the data pipeline 212.

Figure 3:
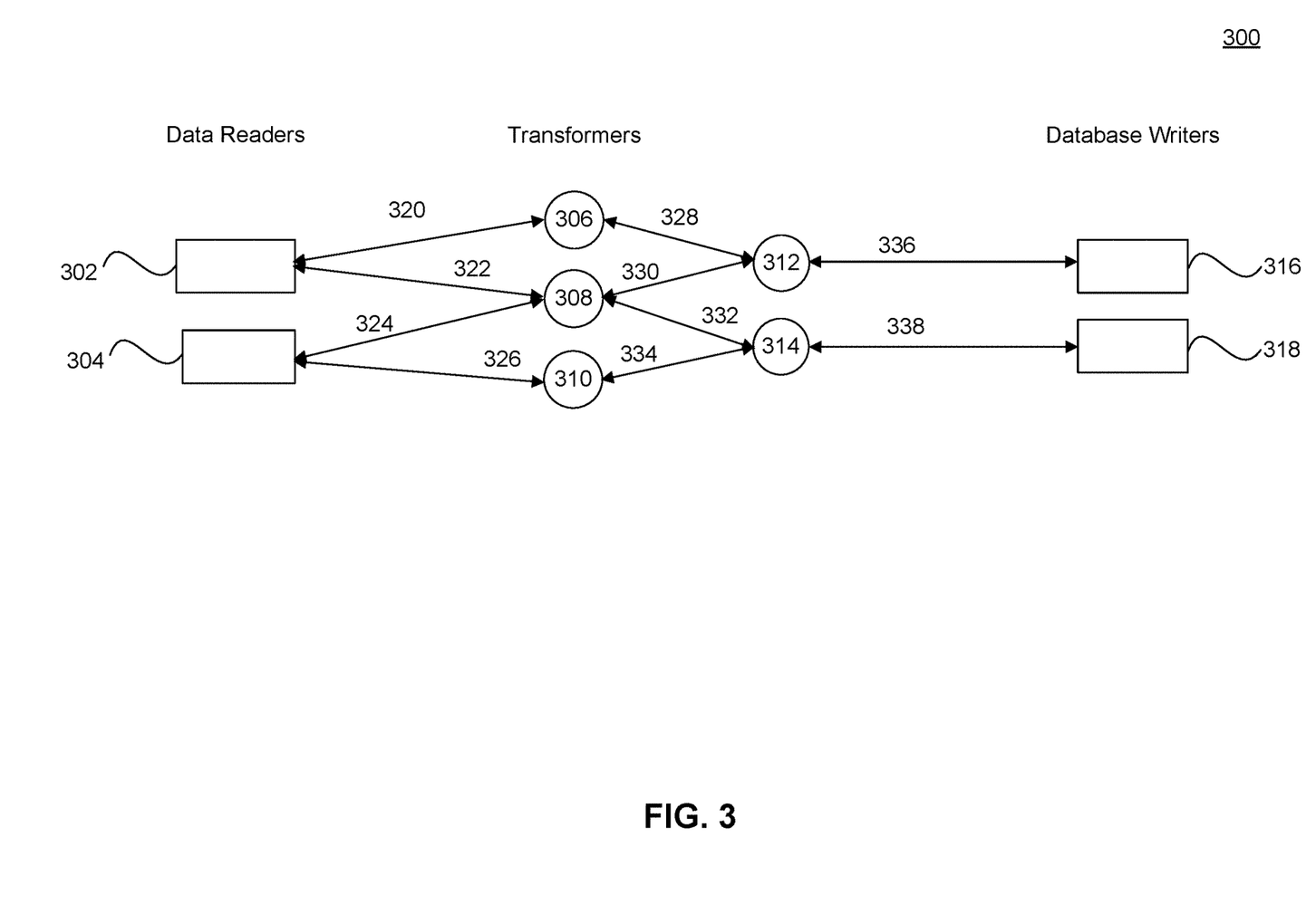
FIG. 3 illustrates a block diagram of another example system of the data processing tool, according to some embodiments of the disclosure.

FIG. 3 illustrates a block diagram of another example system 300 of the data processing tool, according to some embodiments of the disclosure. As a convenience and not a limitation, FIG. 3 may be described with regard to elements of FIGS. 1 and 6. The example system 300 may represent the operation of devices (e.g., the data processing tool 102 of FIG. 1) implementing the dynamic control mechanism. The example system 300 may also be performed by computer system 600 of FIG. 6. But the example system 300 is not limited to the specific embodiments depicted in those figures and other systems may be used to perform the method, as will be understood by those skilled in the art, it is to be appreciated that not all operations may be needed, and the operations may not be performed in the same order as shown in FIG. 3.

In some embodiments, the example system 300 includes database readers 302 and 304 and database writers 316 and 318. The database readers 302 and 304 can also be referred to as ETL source readers or source readers. The example system 300 also includes transformers 306, 308, 310, 312, and 314 that can combine, split, and/or process data received by the database readers 302 and 304. For example, the transformer 308 connects with the database readers 302 and 304 via data pipelines 322 and 324, respectively and receives data from the database readers 302 and 304. The transformer 308 can combine the data received from the database readers 302 and 304. The transformer 308 can also split the data received from the database readers 302 and 304 and write the spit data to data pipelines 330 and 332.

In some embodiments, a congestion condition in one data pipeline can have an impact on other data pipelines in the example system 300. For example, if data pipeline 338 has a congestion condition. The transformer 314 can stop writing to the data pipeline 338 because it cannot take any more data. Therefore, the transformer 314 can also stop taking data or reading data from data pipelines 332 and 334 because the transformer 314 has no place to write data after combining and/or processing the data. In such a case, data start to accumulate in the data pipelines 332 and 334, and eventually create congestion conditions in the data pipelines 332 and 334. These congestion conditions would further affect the transformers 308 and 310, which would stop reading from the data pipelines 322, 324, and 326, Finally, the database readers 302 and 304 may stop reading from the one or more data sources when the data pipelines 322, 324, and 326 become congested. Therefore, the congestion condition in one data pipeline can eventually cause all database readers in the example system 300 to stop reading. In addition, this process also causes other data pipelines to be congested and thus is not ideal.

In some embodiments, the example system 300 can cause all the database readers, such as the database readers 302 and 304, to stop reading once at least one congestion condition is detected. For example, the data pipeline 338 can update a global mutex variable to indicate a reading block when detecting the congestion condition. The database reader 302 and 304 can check the global mutex variable to see if the reading block is present before reading from the one or more data sources. For example, as discussed above, if the global mutex variable is greater than 0, the database readers 302 and 304 may determine that the reading block is present and refrain from reading.

In some embodiments, more than one data pipelines can detect congestion conditions. For example, a data pipeline 336 and the data pipeline 338 can both detect congestion conditions. In such a case, data pipelines 336 and 338 can each add 1 to the global mutex variable, which becomes 2. The database readers 302 and 304 would stop reading because the global mutex variable is greater than 0. In some embodiments, the data pipeline 336 can detect a no-congestion condition and thus subtract 1 from the global mutex variable. In this case, the database readers 302 and 304 would still refrain from reading because the global mutex variable drops to 1 but is still greater than 0. Therefore, clearing one data pipeline does not release the database readers from the reading block. The database readers require all data pipelines of the example system 300 to be in no-congestion conditions.

In some embodiment, the global mutex variable may have multiple entries and each entry corresponds to one data pipeline. For example, the global mutex variable of the example system 300 can be a vector with 10 entries with a default value 0 in each entry. The database readers 302 and 304 may refrain from reading if any entry in the global mutex variable is not 0. When the data pipeline 338 detects the congestion condition, it changes an entry corresponding to the data pipeline 338 to 1 or other non-zero values. The database readers 302 and 304 may determine that the global mutex variable has at least one non-zero entry and thus refrain from reading. When multiple data pipelines detect the congestion conditions, each such data pipeline changes its corresponding entry in the global mutex variable. Therefore, the database readers 302 and 304 may read from the one or more data sources when no congestion condition is detected in any data pipelines of the example system 300.

Figure 4:
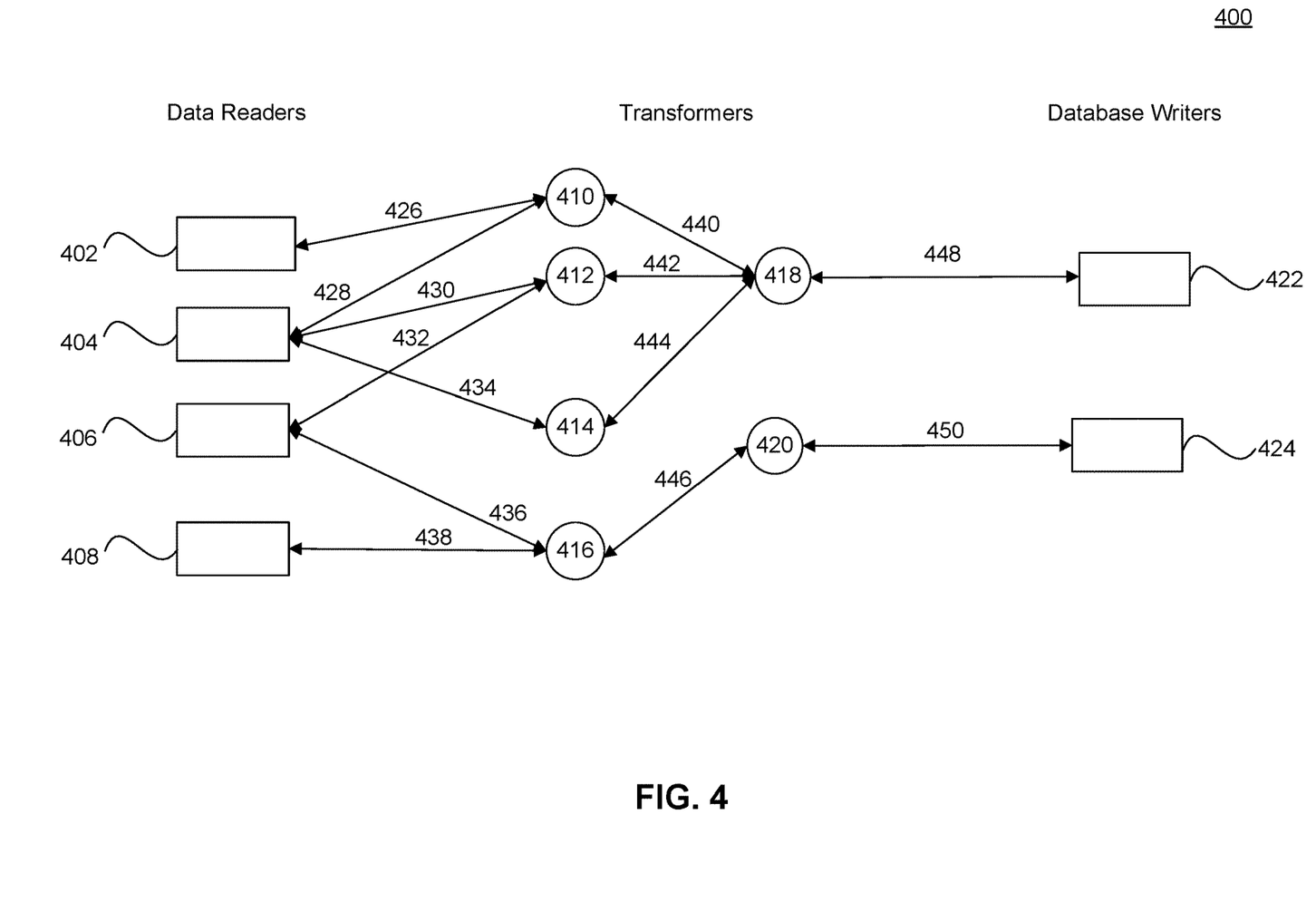
FIG. 4 illustrates a block diagram of yet another example system of the data processing tool, according to some embodiments of the disclosure.

FIG. 4 illustrates a block diagram of yet another example system 400 of the data processing tool, according to some embodiments of the disclosure. As a convenience and not a limitation, FIG. 4 may be described with regard to elements of FIGS. 1 and 6. The example system 400 may represent the operation of devices (e.g., the data processing tool 102 of FIG. 1) implementing the dynamic control mechanism. The example system 400 may also be performed by computer system 600 of FIG. 6. But the example system 400 is not limited to the specific embodiments depicted in those figures and other systems may be used to perform the method, as will be understood by those skilled in the art. It is to be appreciated that not all operations may be needed, and the operations may not be performed in the same order as shown in FIG. 4.

In some embodiments, the example system 400 includes two branches of database writers. A first branch starts from database readers 402, 404, and 406 and ends at a database writer 422. A second branch starts with the database reader 406 and a database reader 408, and ends at the database writer 424. The first branch connects with the second branch at the database reader 406 and thus a congestion condition in one branch may also have an impact on the other branch. For example, if a data pipeline 446 detects a, congestion condition, the transformer 416 may stop reading from a data pipeline 436. Thus the data pipeline 436 may, become congested and the database reader 406 stops reading. Consequently, a data pipeline 432 stops getting input from the database reader 406 and may become empty over time. A transformer 412 takes input from both the data pipeline 432 and a data pipeline 430 to combine data. However, if the data pipeline 432 becomes empty, the transformer 412 cannot process data from the data pipeline 430 alone and thus the data pipeline 430 becomes congested over time as well. In this way, the congestion condition prorogates to the database reader 404 via the data pipeline 430, and eventually to the database reader 402 through the transformer 410 in a similar manner. Therefore, to avoid such congestion condition prorogation effect that makes every data pipeline congested, all database readers, such as the database readers 402, 404, 406, and 408, can refrain from reading data when at least one data pipeline detects a congestion condition. In some embodiments, the database readers 402, 404, 406, and 408 can also be referred to as ETL source readers or source readers.

Figure 5:
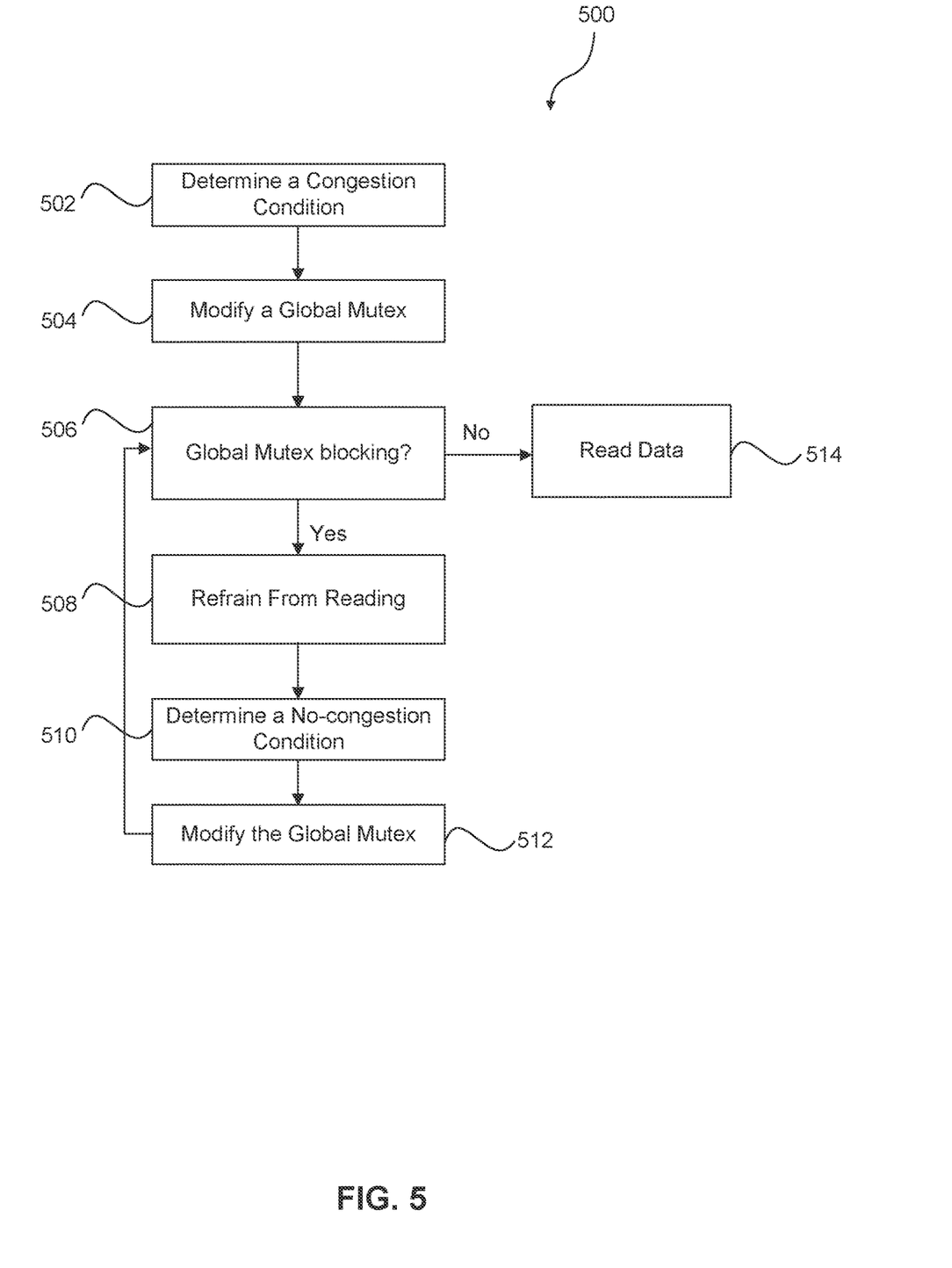
FIG. 5 illustrates an example method for dynamically controlling the data processing tool, according to embodiments of the disclosure.
Figure 6:
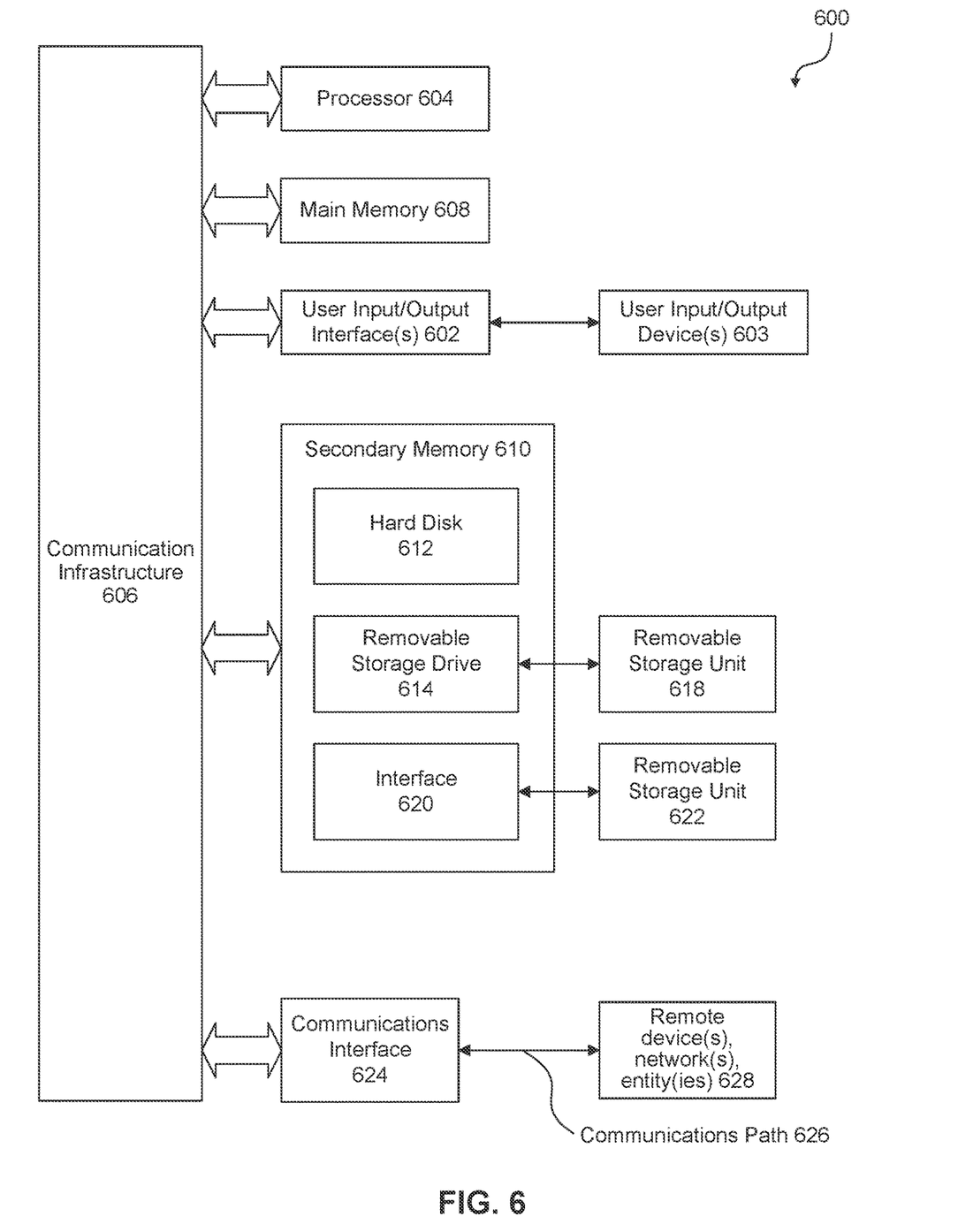
FIG. 6 is an example computer system for implementing some embodiments of the disclosure or portion(s) thereof.

FIG. 5 illustrates an example method 500 for dynamically controlling the data processing tool, according to embodiments of the disclosure. As a convenience and not a limitation, FIG. 5 may be described with regard to elements of FIGS. 1 and 6. The method 500 may represent the operation of devices (e.g., the data processing tool 102 in FIG. 1, the example system 200 of FIG. 2, the example system 300 of FIG. 3, and the example system 400 of FIG. 4.) implementing dynamically controlling the data processing tool. The method 500 may also be performed by computer system 600 of FIG. 6, But the method 500 is not limited to the specific embodiments depicted in those figures and other systems may be used to perform the method, as will be understood by those skilled in the art. It is to be appreciated that not all operations may be needed, and the operations may not be performed in the same order as shown in FIG. 6.

At 502, an element of a data processing tool determines a congestion condition. For example, the data pipeline 212 of FIG. 2 can determine the congestion condition when an amount or a volume of data stored in the data pipeline 212 reaches its storage capacity. In some embodiments, elements other than data pipelines can also detect the congestion condition. For example, transformer 206 can determine a first amount of data that are written into the data pipeline 216. The transformer 208 can determine a second amount of data that are read from the data pipeline 216. Both the first amount and the second amount may be stored in the memory of the example system 200 and can be accessed by any elements of the example system 200. The transformer 206 can determine the amount of data stored in the data pipeline 216 by calculating a difference between the first amount and the second amount. If the amount or volume of data stored in the data pipeline 216 is greater than or equal to its storage capacity, the transformer 206 may determine that the data pipeline 216 is congested. Similarly, the transformer 208 can also determine the congestion condition because it knows the second amount and can retrieve the first amount from the memory of the example system 200.

At 504, the element of the data processing tool can modify a global mutex variable. For example, the data pipeline 212 can add 1 to the global mutex variable when detecting the congestion condition. In some embodiments, the data pipeline 212 can also change an entry of the global mutex variable associated with the data pipeline 212 to be a non-zero value.

At 506, database readers of the data processing tool can determine whether the global mutex variable blocks reading. For example, the database readers 202 and 204 may determine that the global mutex variable is greater than 0 and thus blocks reading. In some embodiments, the database readers 202 and 204 can also determine that at least one entry of the global mutex variable is not zero and thus blocks reading. If the database readers determine that the global mutex variable does not block reading, the control moves to 514. At 514, the database readers read data from the one or more data sources, such as the data sources 104, 106, and 108 of FIG. 1.

Referring back to 506, if the database readers determine that the global mutex variable blocks reading, the control moves to 508. At 508, the database readers, such as the database readers 202 and 204, refrain from reading data.

At 510, the element of the data processing tool may determine a no-congestion condition. For example, the data pipeline 212 may determine that it is no longer congested because the amount or volume of data stored in the data pipeline 212 is less than its storage capacity. In some embodiments, the data pipeline 212 may determine the no-congestion condition when the amount or volume of data stored in the data pipeline 212 reduces to a predetermined level below the storage capacity, such as 80% or 90% of the storage capacity.

At 512, the element of the data processing tool can modify the global mutex variable based on the no-congestion condition. For example, the data pipeline 212 can subtract 1 from the global mutex variable or change the entry of the global mutex variable associated with the data pipeline 212 to be 0. The control then goes back to 506. In some embodiments, the database readers of the data processing tool check the global mutex variable periodically and/or prior to reading data from the one or more data sources.

Various embodiments may be implemented, for example, using one or more computer systems, such as computer system 600 shown in FIG. 6. Computer system 600 may be any well-known computer capable of performing the functions described herein such as the data processing tool 102 of FIG. 1, Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some embodiments, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WA s, the Internet, etc. Control logic and/or data may be transmitted to and from computer system 600 via communication path 626.

The operations in the preceding embodiments may be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A data processing tool comprising:
a memory, one or more processors, and a plurality of database readers, the one or more processors, coupled to the memory and the plurality of database readers, and configured to:
   determine a congestion condition in at least one data pipeline of a plurality of data pipelines of the data processing tool, wherein each data pipeline of the plurality of data pipelines connects:
      a database reader and a transformer of the data processing tool,
      the transformer and a database writer of the data processing tool, or
      two transformers of the data processing tool; and
   increase a value of a global mutex, wherein the increased value of the global mutex indicates the congestion condition was detected;
   responsive to increasing the value of the global mutex, cause at least one of the database reader to pause from reading data or the database writer to pause from writing data;
   determine that the congestion condition has subsided;
   decrease the value of the global mutex, wherein the decreased value of the global mutex indicates the congestion condition has subsided; and
   responsive to increasing the value of the global mutex, cause the at least one of the database reader to continue reading the data or the database writer to continue writing the data.

2. The data processing tool of claim 1, wherein to determine the congestion condition in the at least one data pipeline, the one or more processors are further configured to:
   retrieve, from the memory of the data processing tool, a global mutex; and
   determine whether to refrain from reading data based on the global mutex.

3. The data processing tool of claim 2, wherein the at least one data pipeline is configured to:
   modify the global mutex to indicate the congestion condition.

4. The data processing tool of claim 2, wherein the transformer is configured to:
   modify the global mutex to indicate the congestion condition,
   wherein the transformer connects with the at least one data pipeline.

5. The data processing tool of claim 3, wherein the at least one data pipeline is further configured to:
   determine a volume of data stored in the at least one data pipeline;
   determine that the volume exceeds a storage capacity; and
   modify the global mutex in response to determining that the volume exceeds the storage capacity.

6. The data processing tool of claim 5, wherein the at least one data pipeline is further configured to:
   update the volume of data stored in the at least one data pipeline;
   determine that the updated volume satisfies the storage capacity; and
   modify the global mutex to indicate a no-congestion condition.

7. The data processing tool of claim 6, wherein to determine that the updated volume satisfies the storage capacity, the at least one data pipeline is further configured to:
   determine that the updated volume is smaller than the storage capacity, or
   determine that the updated volume is smaller than a portion of the storage capacity.

8. The data processing tool of claim 6, wherein the one or more processors are further configured to:
   retrieve, from the memory of the data processing tool, the global mutex;
   determine that the global mutex indicates the no-congestion condition; and
   resume reading data from the one or more databases.

9. A method of operating a data processing tool, wherein the data processing tool comprises a memory, one or more processors, and a plurality of database readers, the method comprising:
   detecting a congestion condition in at least one data pipeline of a plurality of data pipelines, wherein each data pipeline of the plurality of data pipelines connects:
      a database reader and a transformer of the data processing tool,
      the transformer and a database writer of the data processing tool, or
      two transformers of the data processing tool;
   increasing a value of a global mutex, wherein the increased value of the global mutex indicates the congestion condition was detected;
   responsive to increasing the value of the global mutex, causing at least one of the database reader to pause from reading data or the database writer to pause from writing data;
   determining that the congestion condition has subsided;
   decreasing the value of the global mutex, wherein the decreased value of the global mutex indicates the congestion condition has subsided; and
   responsive to increasing the value of the global mutex, causing the at least one of the database reader to continue reading the data or the database writer to continue writing the data.

10. The method of claim 9, wherein the determining the congestion condition in the at least one data pipeline further comprises:
    retrieving, from the memory of the data processing tool, a global mutex; and
    determining whether to refrain from reading data based on the global mutex.

11. The method of claim 9, wherein the increasing the value indicates the congestion condition was detected in multiple data pipelines of the plurality of data pipelines.

12. The method of claim 10, further comprising:
    modifying, by the at least one data pipeline, the global mutex to indicate the congestion condition.

13. The method of claim 12, further comprising:
    determining, by the at least one data pipeline, a volume of data stored in the at least one data pipeline;
    determining, by the at least one data pipeline, that the volume exceeds a storage capacity; and
    modifying, by the at least one data pipeline, the global mutex in response to determining that the volume exceeds the storage capacity.

14. The method of claim 13, further comprising:
    updating, by the at least one data pipeline, the volume of data stored in the at least one data pipeline;
    determining, by the at least one data pipeline, that the updated volume satisfies the storage capacity; and
    modifying, by the at least one data pipeline, the global mutex to indicate a no-congestion condition.

15. The method of claim 14, wherein the determining that the updated volume satisfies the storage capacity further comprises:
  determining that the updated volume is smaller than the storage capacity, or
  determining that the updated volume is smaller than a portion of the storage capacity.

16. The method of claim 14, further comprising:
  retrieving, by the one or more processors, from the memory of the data processing tool, the global mutex;
  determining, by the one or more processors, that the global mutex indicates the no-congestion condition; and
  resuming, by the one or more processors, reading data from the one or more databases.

17. A non-transitory computer-readable medium (CRM) comprising instructions to, upon execution of the instructions by one or more processors of a data processing tool, cause the data processing tool to perform operations, the operations comprising:
  determining a congestion condition m at least one data pipeline of a plurality of data pipelines, wherein each data pipeline of the plurality of data pipelines connects:
    a database reader and a transformer of the data processing tool,
    the transformer and a database writer of the data processing tool, or
    two transformers of the data processing tool; and
  increasing a value of a global mutex, wherein the increased value of the global mutex indicates the congestion condition was detected;
  responsive to increasing the value of the global mutex, causing at least one of the database reader to pause from reading data or the database writer to pause from writing data;
  determining that the congestion condition has subsided;
  decreasing the value of the global mutex, wherein the decreased value of the global mutex indicates the congestion condition has subsided; and
  responsive to increasing the value of the global mutex, causing the at least one of the database reader to continue reading the data or the database writer to continue writing the data.

18. The non-transitory CRM of claim 17, wherein the determining the congestion condition in the at least one data pipeline further comprises:
  retrieving, from a memory of the data processing tool, a global mutex; and
  determining whether to refrain from reading data based on the global mutex.

19. The non-transitory CRM of claim 18, wherein the operations further comprise:
  determining a volume of data stored in the at least one data pipeline;
  determining that the volume exceeds a storage capacity; and
  modifying the global mutex in response to determining that the volume exceeds the storage capacity.

20. The non-transitory CRM of claim 19, wherein the operations further comprise:
  updating the volume of data stored in the at least one data pipeline;
  determining that the updated volume is below the storage capacity; and
  modifying the global mutex to indicate a no-congestion condition.

* * * * *